(No Model.)
C. VAN HOESEN.
ICE PLOW.
No. 424,382. Patented Mar. 25, 1890.
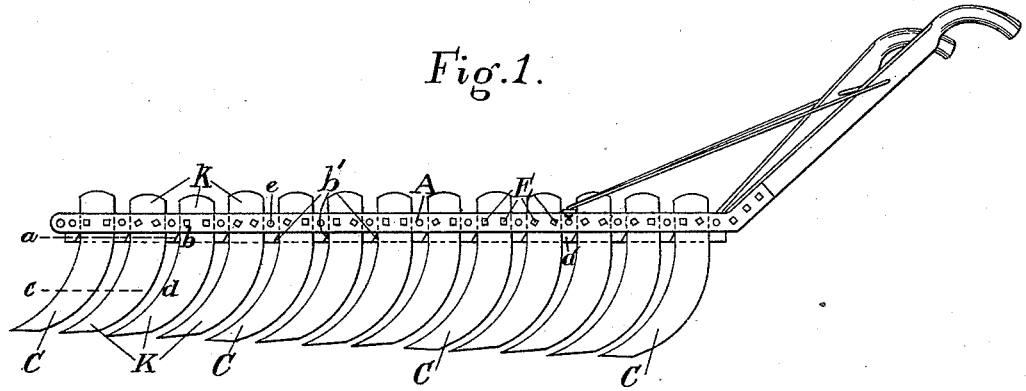
Fig. 1.
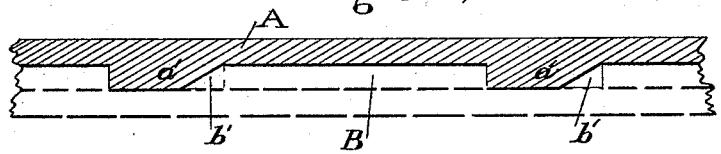
Fig. 3. Section a-b.
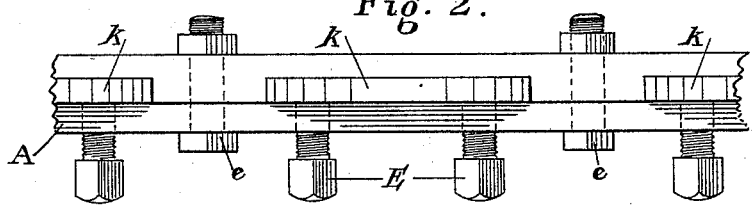
Fig. 2.
Fig. 4.
Section c-d.
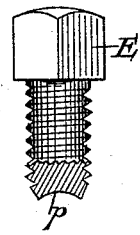
Fig. 5.
WITNESSES:
John N. Mayer
Grace T. Many
INVENTOR
Charles Van Hoesen
BY
Frederick N. Cameron
ATTORNEY.
N. PETERS, Photo-Lithographer, Washington, D. C.

UNITED STATES PATENT OFFICE.

CHARLES VAN HOESEN, OF COEYMANS, NEW YORK.

ICE-PLOW.

SPECIFICATION forming part of Letters Patent No. 424,382, dated March 25, 1890.

Application filed October 28, 1889. Serial No. 328,462. (No model.)

*To all whom it may concern:*

Be it known that I, CHARLES VAN HOESEN, a citizen of the United States, residing at Coeymans, in the county of Albany, State of New York, have invented a new and useful Improvement in Ice-Plows, of which the following is a specification.

My invention relates to improvements in machinery for cutting ice in a pond, river, or stream; and the object of my invention is to produce an ice-plow provided with a series of knives which may be adjusted to correspond with the thickness of the ice to be cut, and to provide in connection with the knives certain clearers, also adjustable in relation to the thickness of the ice. I attain these objects by the mechanism illustrated in the accompanying drawings, in which—

Figure 1 is a side elevation; Fig. 2, a plan of my plow; Fig. 3, a section along the line *a b* on Fig. 1; Fig. 4, a section along the line *c d* on Fig. 1, and Fig. 5 a detail view of the adjusting-bolt.

Similar letters refer to similar parts throughout the several views.

Heretofore it has been necessary to provide separate plows for varying thicknesses of ice, making it necessary to have on hand six or seven plows in order to be prepared to harvest a field of ice. By my invention I do away with the necessity of procuring and keeping in readiness for operation so many plows by making the knives on my plow adjustable, rendering it capable of cutting ice varying to a considerable degree in thickness.

The head A of my plow is provided with a series of longitudinal slots B, into which the upper portion of the shank *k* of the knives K and clearers C are secured. One side of the head A is narrower than the opposite side, (see Fig. 3,) and the separating part of the head A, between the knives, is beveled at its corner nearest the cutting-edge of the knife, forming an opening between the knife and the head, through which the chips of ice produced by cutting may escape, when the opposite side of the head is in contact with the ice.

The knife or cutter K is slightly curved and sharpened along its concave edge, provided with retreating flanged sides. The heel of the knife-blade is slightly raised from the horizontal plane passing through the point of the knife. The upper portion of the shank of the knife *k*, above the cutting-edge, is provided with parallel vertical edges and fits snugly in the slot B of the head A, extending above the head a short distance and held securely in position by means of the adjustable bolts E, passing through one side of the head A and pressing against the shank *k* of the knife K. Said bolt E is square on the end in order that it may be operated by a wrench, and is provided with a saucer-point P, (see Fig. 5,) which sinks into the shank *k* of the knife K.

The shank of the knife K is long enough to allow the knife to be dropped several inches, thus enabling it to be adjusted to correspond with the thickness of the ice to be operated upon.

In connection with the knives K, I arrange a series of clearers C, for the purpose of throwing out the chips, loose snow, and other substances from the course to be pursued by the knife. The clearer C is similar in form to the knife, being slightly curved and provided with a shank with vertical sides fitting snugly in the slot B, but without a cutting-edge, and having its heel and toe in the same horizontal plane, in such a manner that its foot will slide in contact with the ice throughout its whole length. It is adjustable in the head by means of the bolts E in the same manner that the knife K is adjusted.

I usually place my knives and clearers in the following order: Beginning at the front of the plow farthest from the handle, I place, first, a clearer, then a knife arranged to cut a certain distance into the ice—for instance, one-quarter of an inch—following that knife another arranged to cut one-quarter of an inch below the first, then a third knife cutting one-quarter of an inch below the second, then a clearer, following that three other knives, each cutting one-quarter of an inch, followed by a clearer, and so on throughout the series of knives and clearers. After the plow has cut into the ice to such a depth that the widest side of the head of the plow A comes into contact with the surface of the ice, and it becomes necessary to cut still deeper, the knives and clearers may be lengthened by adjusting the bolts E, allowing the knives and clearers to extend sufficiently below the head A to cut the ice the requisite depth. When the head of the plow is sliding along on top of the ice, the chips of ice pass out through the openings made by the beveled portion b adjoining the shanks of the knives and clearers.

In case the point of a knife is broken, as sometimes occurs, the knife is not destroyed, but may be ground on a grindstone and lowered in the head, making it occupy the position that it did before the injury, and it may be used again. In the case of non-adjustable knives the breakage of a point makes it necessary to obtain a new knife for the plow.

I do not limit myself to the exact sequence of knives and clearers as herein described, nor do I mean to state that the comparative depth of the cut for each knife as herein set forth is either obligatory or advisable. Those matters may be arranged by the operator as he deems best under the circumstances as they exist.

What I claim as my invention, and desire to secure by Letters Patent, is—

1. In an ice-plow, the combination of a series of knives, each curved longitudinally, provided with a concave cutting-edge, its upper portion having vertical parallel sides, with one or more clearers, each curved longitudinally, provided with an elongated shank, both the series of knives and clearers adjustably secured in slots provided therefor in the head of the plow, all substantially as described, and for the purpose as set forth.

2. In an ice-plow, the combination of the head A, provided with a series of slots B, one of the vertical sides of the head wider than the other, the separating portion of the head between the slots B B extending below the narrow side of the head, beveled at the corner b nearest the concave edge of the clearer and knife, with a series of clearers and knives, each curved longitudinally, each having an elongated shank provided with vertical edges above the curved portion adjustably secured in the slots B, with the bolts E passing through the side of the head A and pressing against the shank k of each of the series of knives and clearers, all substantially as described, and for the purpose as set forth.

3. In an ice-plow, the combination of a plow-head A, provided with a series of slots B, with a series of knives and clearers adjustable therein and arranged in the following order: first a clearer, then a series of knives, the point of each knife after the first extending a short distance below the one preceding it, a clearer following the last knife of the series, the foot of said clearer in the same horizontal plane as the point of the knife immediately preceding it, then a series of two or more knives, their points arranged relatively to each other, similar to the first series, followed by a clearer, all substantially as described.

CHAS. VAN HOESEN.

Witnesses:
FREDERICK W. CAMERON,
WALTER E. WARD.